(12) United States Patent
Alperovich et al.

(10) Patent No.: US 6,233,448 B1
(45) Date of Patent: May 15, 2001

(54) SYSTEM, METHOD AND APPARATUS FOR AUTOMATIC FEATURE ACTIVATION/ DEACTIVATION BASED UPON POSITIONING

(75) Inventors: Vladimir Alperovich, Dallas; Ranjit Bhatia, Lewisville, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/120,969

(22) Filed: Jul. 22, 1998

(51) Int. Cl.[7] .................................................. H04M 3/54
(52) U.S. Cl. .................... 455/417; 455/414; 455/456; 455/462; 455/465
(58) Field of Search .................................. 455/456, 414, 455/417, 432, 433, 445, 462, 465

(56) References Cited

U.S. PATENT DOCUMENTS

| | | | | |
|---|---|---|---|---|
| 5,442,805 | * | 8/1995 | Sagers et al. | 455/88 |
| 5,673,308 | * | 9/1997 | Akhavan | 455/417 |

* cited by examiner

*Primary Examiner*—Lee Nguyen
(74) *Attorney, Agent, or Firm*—Jenkens & Gilchrist,P.C.

(57) ABSTRACT

A system, method and apparatus for activating and deactivating features in a mobile telecommunications system based upon the position of a mobile station. An accurate position of the mobile station is periodically determined and compared with stored coordinates for a specific location. Depending upon the outcome of this comparison, selected features are automatically activated or deactivated.

31 Claims, 5 Drawing Sheets

SYSTEM, METHOD AND APPARATUS FOR AUTOMATIC FEATURE ACTIVATION/ DEACTIVATION BASED UPON POSITIONING

BACKGROUND OF THE INVENTION

1. Technical Field of the Invention

The present invention relates to a system, method and apparatus for activating and deactivating features in telecommunications networks, and in particular, for automatically activating and deactivating features based upon a calculated position of a mobile station.

2. Description of Related Art

As cellular and other types of mobile telecommunications systems have become more accessible and affordable, many people have begun to accumulate multiple directory numbers, each associated with one of a variety of mobile and/or wireline telecommunications devices. As a result, such persons can be reached at different numbers at different times, depending on where they are located. For example, it is not uncommon for an individual to have a home phone number, an office phone number, a mobile phone number, a pager number, and a voice mailbox number. In addition, the same individual might also have one or more modem numbers, an office fax number, a home fax number, a mobile fax number, and an electronic mail (e-mail) address. In other words, a person might have access to a relatively large assortment of telecommunications devices but can only be reached via a fraction of those devices at any given time.

To reach such a person, a caller might have to try several different numbers, or if the caller does not know more than one or two of the directory numbers, he might not be able to reach the person he is trying to call in a timely manner. An individual with several different directory numbers can also be inconvenienced if she wishes to promptly receive calls, messages, or faxes. To promptly receive voice calls, such an individual must rely upon others knowing and trying several different numbers, or she must rely upon frequently checking her various voice mail systems and/or answering machines to receive messages. In addition, fax or data transmissions might not be promptly received unless the sender happens to send the transmission to a number at which the receiving party is currently located. As a result, the availability of a variety of accessible telecommunications systems can sometimes result in frustration on the part of both attempted callers and parties to which calls are attempted.

One method of alleviating this problem is to implement call forwarding capabilities in each of the variety of telecommunications systems. This solution allows an individual to, for example, have calls that are placed to his home phone forwarded to his mobile phone or vice versa. By using such a feature, the frequency with which calls are missed or with which callers receive no answer can be significantly reduced. The problem, however, is that this solution requires that the forwarding features in the various systems be manually changed each time the individual leaves work, leaves home, or otherwise wishes to alter the call forwarding instructions based upon a change of location. This process can be very time consuming and complex. Similarly, an individual might want to activate other types of telecommunications-related features depending on where she is located. Again, however, this normally requires the implementation of manual activation or deactivation procedures.

Accordingly, it is an object of the present invention to provide an automatic system, method and apparatus for activating or deactivating telecommunications features based upon the calculated or measured position of a mobile station.

It is also an object of the present invention to provide a way to automatically forward calls to an appropriate directory number based upon the current position of a mobile station.

SUMMARY OF THE INVENTION

The present invention is directed to a system, method and apparatus for performing selected actions based upon the location of a mobile station in a mobile communications network. The mobile station or mobile network includes circuitry for, or is otherwise capable of performing a method for periodically determining the current position of the mobile station. This positioning information is then compared to a preselected location at which some action is to be taken. A memory within the mobile communications network, or within the mobile station itself, stores one or more such preselected locations and also stores information relating to the selected actions associated with each particular preselected location. If, based on the above-mentioned comparison, the current position of the mobile station is within a predetermined distance from the preselected location, then the corresponding actions are automatically performed. In one aspect of the invention, one or more selected telecommunications features are activated or deactivated based upon whether the mobile station is within a certain distance of a preselected location. In an additional aspect of the invention, selected call forwarding features, within either a mobile or a wireline telecommunications network, are activated depending upon a current location of the mobile station. In an additional aspect of the invention, data relating to the selected actions and the preselected locations is stored in a subscriber identity module (SIM) within the mobile station. In yet another aspect of the invention, the comparisons between the current location of the mobile phone and a preselected location are only performed when the mobile phone is within the general vicinity of the preselected location.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
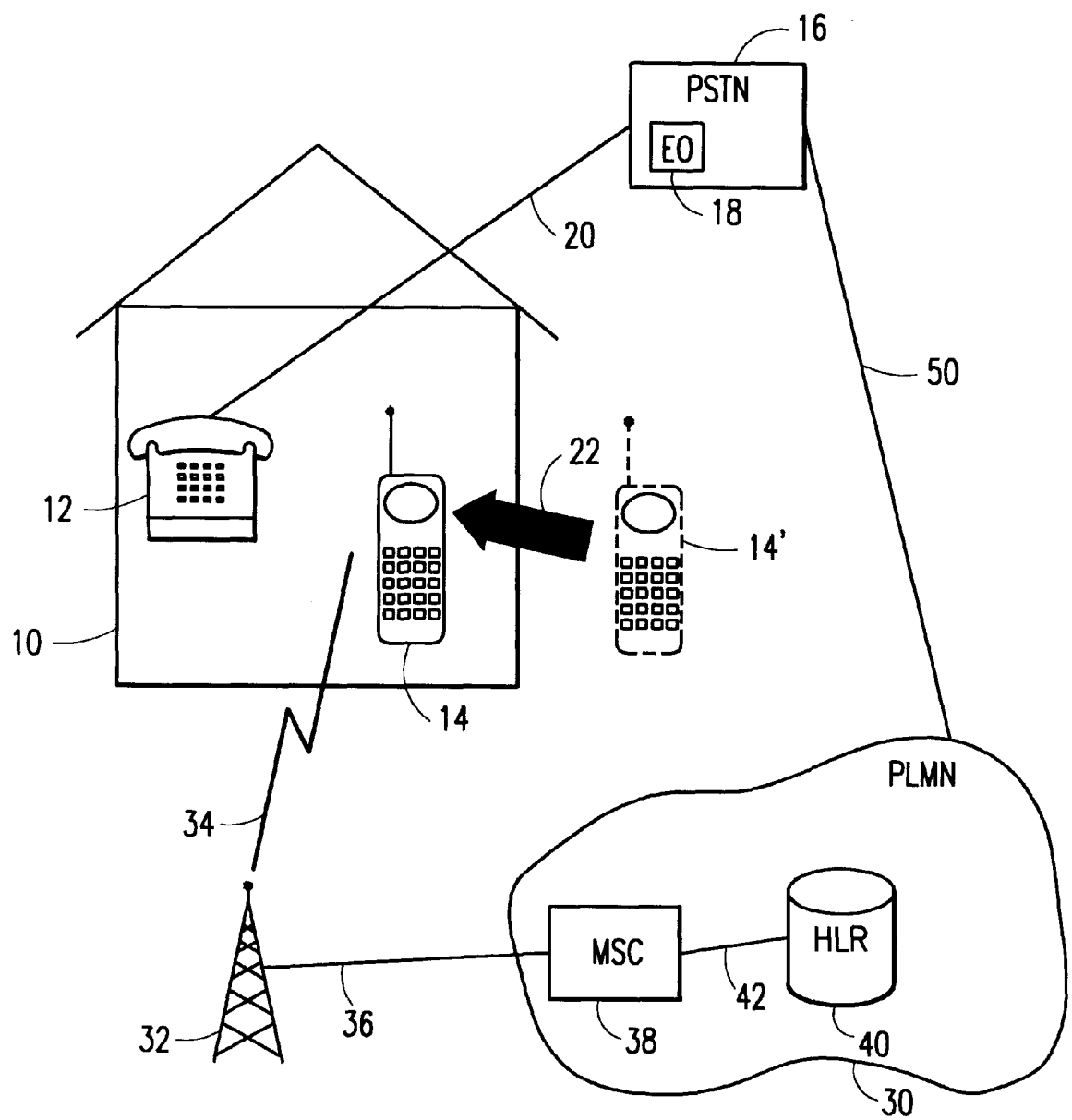
FIG. 1 is a block diagram of a mobile telecommunications network and a wireline telecommunications network for illustrating a scenario in which a mobile subscriber phone arriving at home.

Referring now to FIG. 1, there is shown a block representative diagram of a mobile subscriber's household or place of business 10 that is served by both a wireline phone 12 and a mobile phone 14. The wireline phone 12 is conventionally attached to a public switched telephone network (PSTN) 16 via a wire or cable 20. The mobile phone 14 is in communication with a base station transceiver 32 via a radio link 34. A base station 33 associated with the base station transceiver 32 in turn relays signals via an interface 36 to and from a mobile switching center (MSC) 38, which is part of a public land mobile network (PLMN) 30. As illustrated in FIG. 1, the mobile phone 14 is currently located in the subscriber's home, and in this scenario, it would normally be desirable to receive calls only on the wireline phone 12 or, for fax or data calls, at a particular fax or data terminal 13, thereby avoiding air time charges and battery drain caused by using the mobile phone 14. The present invention involves a system, method and apparatus that, in one embodiment, enables calls to be automatically forwarded to a mobile subscriber's home phone when that mobile subscriber is at home.

To perform this function of the invention, the mobile phone 14 preferably includes circuitry for monitoring the position of the mobile phone 14. For example, a global positioning system (GPS) receiver contained within the mobile station 14 can be used to determine the coordinates of the mobile station 14 to within about ±10 feet accuracy. Alternatively, the approximate coordinates can be calculated by measuring the timing advance, or propagation delay, of signals traveling between the mobile station 14 and each of a plurality of base station transceivers 32 or other such triangulation positioning technique, which can then be used to calculate a relatively accurate position estimate for the mobile station 14. Finally, if very small cells are used (e.g., a picocell or other cell having a radius of only a few hundred feet or less), the approximate coordinates of the mobile station 14 can be determined by monitoring the cell global identity number of the cell in which the mobile station 14 is located. The particular mechanism used for positioning, however, is not a critical aspect of the invention; it will be recognized that other possible methods for determining a positioning estimate might also be used. In another aspect of the invention, the general position of the mobile station 14 can be determined by identifying the cell ID and/or home ID number.

The coordinates or position of the phone are measured periodically at a preselected interval, such as daily, hourly, over a number of minutes or seconds, or in an alternative embodiment, the necessary measurements for positioning are made in response to a request from a base station 33, an MSC 38, a home location register (HLR) 40, or some other device within the PLMN 30. Furthermore, the calculations to determine positioning can be made either by the mobile station 14 itself or by a processor located within or connected to the PLMN 30, such as at a given base station 33, an MSC 38, or the HLR 40, once the necessary data has been provided.

Figure 2:
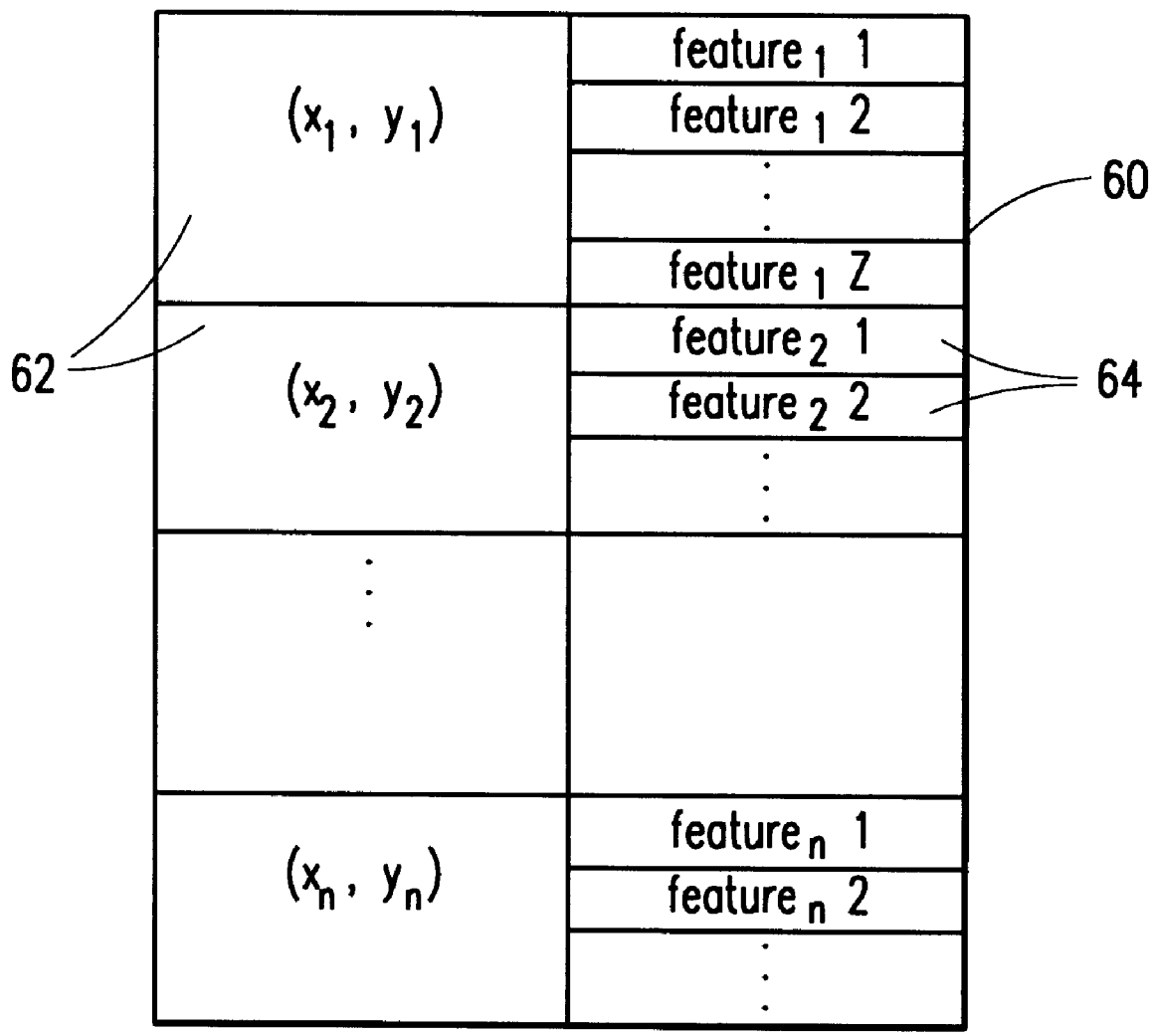
FIG. 2 is an illustration of a data array for storing features in accordance with the present invention.

Referring now to FIG. 2, there is illustrated a data array 60 in accordance with the present invention. Generally, the position of the mobile phone 14 is compared with each of a plurality of activation locations to determine whether particular actions, such as the activation or deactivation of a telecommunications feature, are necessary. The data array 60 is preferably used to store coordinates $(x_i, y_i)$ or some other indication of position, such as a cell ID number or home ID number, for the activation locations 62 at which the mobile station 14 is to take some action. The activation locations 62 generally consist of a two dimensional or Cartesian set of coordinates. Three dimensional coordinates, however, can also be used, thereby allowing the activation of features based, for example, on the specific location of a mobile station 14 within a tall office building or elevated terrain. Associated with each activation location 62 in the data array 60 are one or more selected action codes 64. Each action code 64 essentially provides instructions for activating a telecommunications feature. Preferably, the data array 60 is stored in either a subscriber identity module (SIM) card within the mobile phone 14 or an HLR 40 associated with the mobile phone 14. It will be appreciated, however, that the data array 60 can be stored in a variety of other locations or nodes contained within or attached to the PLMN 30. The coordinates or other positioning data for each activation location, and the corresponding action codes, are normally programmed into the SIM or transmitted to the HLR 40 to be stored in the data array 60 in response to a command entered at the mobile station 14 by the subscriber. The subscriber, for instance, might select a command from a menu that causes the current location (e.g., the coordinates or cell ID number) of the mobile unit to be stored as an activation location. Additional commands could then be selected to identify the particular actions that are to be associated with that location.

Each time the coordinates or position of the mobile phone 14 are determined, the calculated coordinates or position is compared against each of the activation locations stored in the data array 60. If the coordinates of the mobile phone 14 are determined to be within a predetermined distance from the coordinates of an activation location 62, e.g., within a number of yards, meters or feet, the particular action code 64 associated with the activation location 62 triggers the activation of the preselected features. The predetermined distance essentially serves as a "buffer zone," permitting some movement around the activation location 62 without causing the activation or deactivation of features, and also accounting for slight errors in the calculation of the coordinates of the mobile phone 14. The size of the predetermined distance can be adjusted depending upon, for example, the desired size of the activation location 62 or the permissible amount of error in determining the position of the mobile station 14. Similarly, if the position of the mobile phone is determined to be within a cell identified by a cell ID number stored in the data array 60, the particular action code 64 associated with the activation location 62 triggers the activation of the preselected features.

An exemplary process and system for activating selected telecommunications features in accordance with the present invention will now be described by again referring to FIG. 1. As generally depicted by the arrow 22 in the drawing, a mobile phone 14 is being carried into a mobile subscriber's home 10 from a distant location outside of the subscriber's home 10 (as generally indicated at 14'). For purposes of this illustration, it will be assumed that a SIM card contained within the mobile station 14 stores a data array 60 identifying the subscriber's home as an activation location 62. In accordance with the invention, the mobile station 14 periodically compares the current position of the mobile station 14 with the activation locations 62 stored in the data array 60. Upon determining that the position of the mobile phone 14 is within a predetermined distance of the home coordinates, the action codes 64 associated with the activation location 62 trigger a call forwarding feature. According to this call forwarding feature, calls placed toward the mobile phone's directory number are forwarded to the directory number associated with the subscriber's home phone 12. Similarly, the call forwarding feature may involve the forwarding of fax or data calls to a particular fax or data terminal 13, which can be located in the home 10 or at some other location and can be connected to the same line as the home phone 12 or to a different line. Normally, such a call forwarding feature is activated by automatically transmitting an activation code over radio link 34 to a base station 33, an MSC 38 (or a visitor location register (VLR)) associated therewith, or the HLR 40. Incoming calls are then intercepted by the MSC/VLR 38 or HLR 40 and forwarded across line 50, through the PSTN 16, and to the wireline phone 12 via line 20. As will be appreciated, the call can also be forwarded to some other specified destination in a similar manner.

In an alternative embodiment, the data array 60 is stored in the HLR 40. In this embodiment, coordinates indicating the current position of the mobile station 14 are periodically sent to the HLR 40. The received coordinates are compared to the activation locations 62 stored in the data array 60, as discussed, and when a match is found, the preselected telecommunications features (e.g., call forwarding) are automatically activated.

Figure 3:
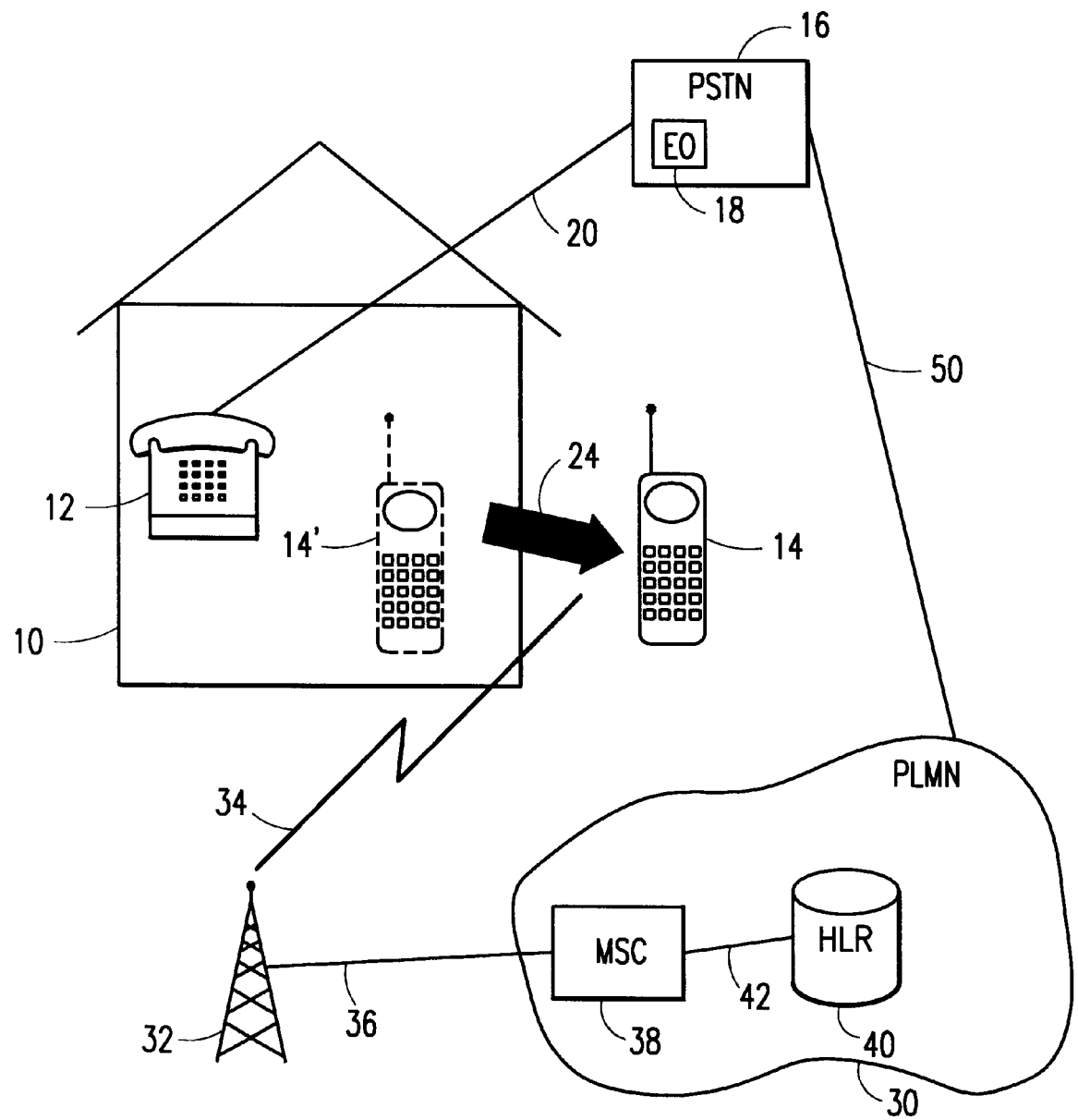
FIG. 3 is a block diagram of a mobile telecommunications network and a wireline telecommunications network for illustrating a scenario in which a mobile subscriber phone is leaving home.

Referring now to FIG. 3, the system of FIG. 1 is illustrated where the mobile station 14 is being carried away from the subscriber's home location 10 (as generally indicated by the arrow 24). Upon detecting that the mobile station 14 has left the subscriber's home (again, by comparing the calculated coordinates or position with the activation locations 62), the previous call forwarding feature is deactivated by automatically sending a deactivation code over the radio link 34 to the PLMN 30.

In addition, a new call forwarding feature is activated to forward calls that are placed toward the directory number associated with the subscriber's home phone 12 to the subscriber's mobile phone 14. To activate this feature in a system where the positioning comparisons are performed by the mobile phone 14 itself, the mobile phone 14 automatically places a call to an end office (EO) 18 located within the PSTN 16. In a system where the positioning comparisons are performed at the HLR 40, on the other hand, the HLR 40 transmits instructions to the mobile unit 14 to place a call to the end office 18. The end office 18 generally controls various features associated with the wireline phone 12 or the fax or data terminal 13, such as call waiting, call forwarding, etc. Existing telecommunications network procedures, such as Remote Access to Subscriber's Features (RASF), permit access to and modification of such features from a remote location using, for example, a touch tone phone. Accordingly, by placing a call to the end office 18, the mobile phone 14 can automatically activate the call forwarding feature using RASF or some similar procedure.

The invention has thus far been described with reference to a mobile subscriber's home as an activation location 62. However, activation locations 62 can also include a variety of other specific locations, such as the subscriber's office or other places that the subscriber frequently visits. For example, the subscriber might not want to be interrupted while eating at a restaurant that he frequents. By properly formatting the data array 60 in the SIM card or the HLR 40, such calls can be forwarded to a voice mailbox when the subscriber is at that restaurant.

It will further be recognized by those of ordinary skill in the art that the invention can also be used in connection with the activation of features other than simple forwarding of calls. The invention might also be used, for instance, to activate an Internet application or to forward some calls, such as voice calls, while not forwarding others, such as fax or data calls, when the subscriber is at a particular location. Furthermore, in accordance with the invention, it is possible to activate multiple features when the mobile station 14 is at a certain location, and to have a different combination of features associated with each different activation location 62.

Figure 4:
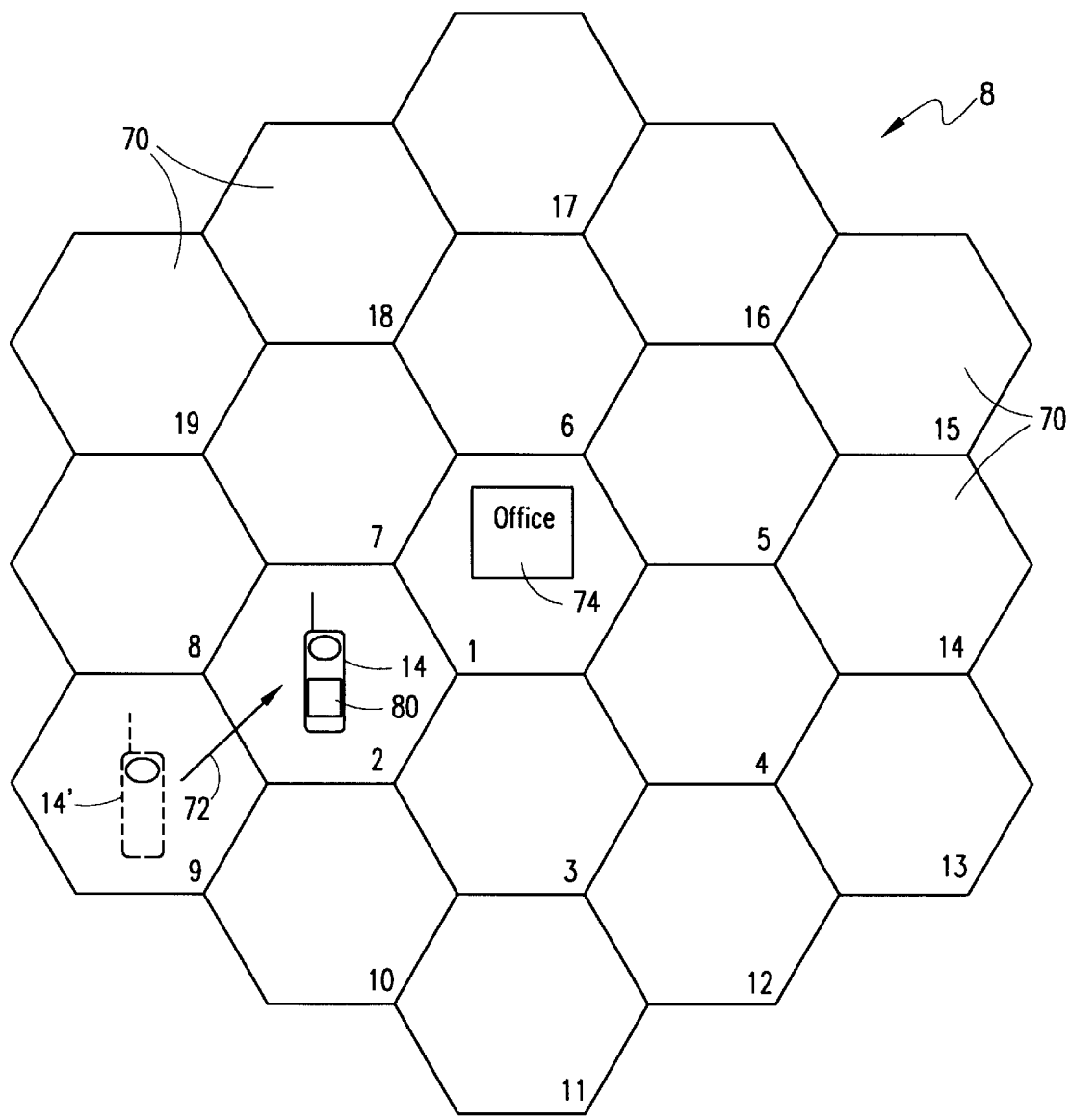
FIG. 4 is a block diagram of a multi-cell portion of a mobile telecommunications network.

In another embodiment of the invention, comparisons between the mobile station's current position and a particular activation location 62 are only performed when the mobile station 14 is within the general vicinity of that particular activation location 62. Referring now to FIG. 4, there is shown a plurality of cells 70 in a mobile telecommunications network 8 for illustrating this alternative embodiment. A mobile subscriber's office 74 is located within a first cell 70(1), located in the center of the figure, and a data array 60 in the SIM card 80 has been formatted to activate certain features once the mobile phone 14 is located at the office 74.

Each cell 70 generally defines a certain area in which mobile stations 14 communicate with a base station transceiver 32 associated with that cell 70. In current systems, the cells 70 are large enough that positioning based upon which cell 70 the mobile station 14 is communicating with can provide only a very general estimate of the territory in which the mobile station 14 is located. Furthermore, the territory served by a particular cell's base station transceiver 32 is not exclusive; a mobile station 14 will often be in communication with a nearby cell 70 based on a superior signal quality or because of the current unavailability of a communication channel in a particular cell 70.

Ordinarily, comparisons between the calculated coordinates or position and the selected activation locations 62 occurs each time a new coordinate or position is calculated regardless of which cell 70 the mobile phone 14 is located in. In this alternative embodiment, however, the comparisons are only made when the mobile station 14 is in a particular cell or block of cells where an activation location 62 is situated. This aspect of the invention avoids an unnecessary use of processing resources that would result from comparing the mobile station's current location with the office coordinates stored in the SIM card 80 when the mobile station 14 is in a geographically remote location. Thus, no such comparison is made, for example, when the mobile phone 14 is located in a distant cell 70(9) (as indicated by the shadow mobile phone 14'). Instead, in this example, comparisons between the current location and the stored coordinates are initiated only when the mobile phone 14 travels into the first cell 70(1), in which the office 74 is located, or one of the immediately adjacent cells 70(2)–70(7), as determined by a unique cell identity number associated with each cell 70. Thus, once the mobile station 14 moves from a distant cell 70(9) into an adjacent cell 70(2) (as indicated generally by the arrow 72), the mobile station 14 recognizes the new cell 70(2) by its cell identity number and begins to calculate the distance between the current position of the mobile station 14 and the stored coordinates for the office 74. If this calculated distance becomes less than some predetermined threshold, the features associated with the location of the subscriber's office 74 are automatically activated.

Figure 5:
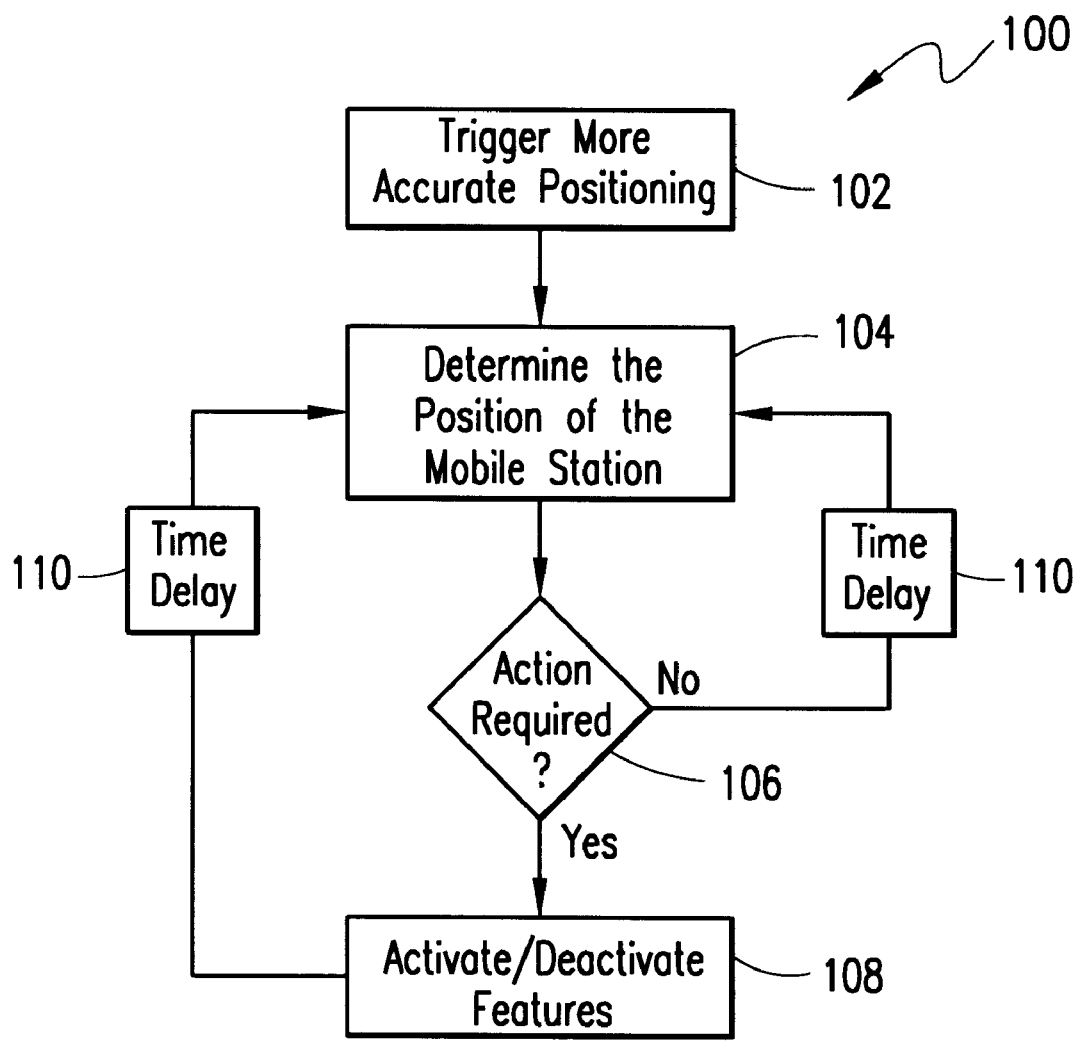
FIG. 5 is a flow diagram of a method for activating and deactivating features based on the position of a mobile station in accordance with the present invention.

Referring now to FIG. 5, there is shown a flow diagram of a method 100 for activating and deactivating features based upon positioning in accordance with the present invention. At step 102, the mobile station's 14 movement into a cell 70 containing an activation location 62 is detected, thereby initiating a process for more accurately calculating the mobile station's 14 position. Next, at step 104, the approximate coordinates of the mobile station 14 are determined. These coordinates are compared at step 106 to the stored coordinates of a specified location or locations, such as a mobile subscriber's 14 home and/or office coordinates, to determine if some type of action is required. If a match is not found, then no action is currently required, and the position of the mobile station 14 is again determined at step 104, generally after some time delay 110. If, on the other hand, a match is found between the current mobile station coordinates and the stored coordinates, some action (step 106) is required. As a result, an action or actions corresponding to the current coordinates, such as the activation or deactivation of features, are performed at step 108, and the process returns to step 104 where a new positioning calculation is made (again, after some time delay 110). This process continues until the mobile station 14 leaves the cell 70 or group of cells 70 where the specified location is located, at which time the accurate positioning calculations and/or the comparisons with the stored coordinates are stopped.

In accordance with the method of the invention, the required actions are generally only performed upon an initial detection of a location match. In other words, the action or actions are not repeatedly performed while the mobile station 14 remains in the same location; rather, a new action is not performed until the mobile station 14 leaves the specified location. Moreover, actions are also sometimes based upon the absence of a match between the mobile phone's 14 current coordinates or position and a specified location. For example, one set of features might be activated when the phone is in a specified location, while a different set of features are activated when the phone 14 is not at that location.

Furthermore, in accordance with a preferred embodiment of the invention, a feature will normally remain activated until it is deactivated. Thus, features will remain activated even after the mobile station 14 is turned off. As a result, desired features can be automatically activated by simply turning on the mobile phone 14 upon arriving at a certain location. This causes the position of the mobile phone 14 to be determined and the necessary features to be activated. The phone 14 can then be turned off, and the features will remain activated until they are manually deactivated or the phone 14 is detected at a new location.

Although preferred embodiments of the system, method and apparatus of the present invention have been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for performing selected actions in a telecommunications system based upon the location of a mobile station therein, said method comprising the steps of:
   determining a specific location of said mobile station;
   comparing said determined location to a preselected location; and
   activating automatically a call forwarding feature depending upon whether, during said step of comparing, said determined location is within a predetermined distance from said preselected location.

2. The method of claim 1, wherein the specific location of the mobile station is determined by a global positioning system.

3. The method of claim 1, wherein the specific location of the mobile station is determined by measuring a propagation delay of signals between the mobile station and each of a plurality of base stations.

4. The method of claim 1, wherein calls placed to a directory number associated with said mobile station are forwarded to a directory number associated with a wireline phone.

5. The method of claim 1, wherein calls placed to a directory number associated with a wireline phone are forwarded to a directory number associated with said mobile station.

6. The method of claim 1, wherein said step of activating a call forwarding feature comprises the step of automatically calling an end office in a public switched telephone network from said mobile station, wherein said end office controls the call forwarding features.

7. The method of claim 6, wherein said step of activating the call forwarding feature further comprises the use of a Remote Access to Subscriber's Features (RASF) procedure.

8. The method of claim 1, further comprising performing said step of comparing said determined location to a preselected location in response to an establishment of communications between said mobile station and one or more selected cells.

9. The method of claim 1, further comprising performing said step of determining a specific location on a predetermined periodic basis.

10. The method of claim 1, further comprising the step of automatically activating a plurality of selected telecommunications features associated with said preselected location.

11. The method of claim 1, further comprising the step of storing said preselected location at said mobile station.

12. The method of claim 1, further comprising the step of storing said preselected location at a register in a home location register (HLR).

13. The method of claim 1, wherein said determined location and said preselected location each comprise a set of coordinates.

14. The method of claim 13, wherein said set of coordinates is Cartesian.

15. The method of claim 13, wherein said set of coordinates is three-dimensional.

16. A telecommunications system for activating at least one selected feature depending upon a location of a mobile station within said system, comprising:
   a memory for storing at least one selected activation location and at least one call forwarding feature associated therewith;
   positioning means for determining a specific location of said mobile station within said system;
   a comparator for comparing said specific location with said at least one selected activation location; and
   activation means for activating said at least one call forwarding feature depending upon whether said specific location of said mobile station is within a predetermined distance of said at least one selected activation location.

17. The telecommunications system of claim 16, further comprising a wireline phone, wherein said call forwarding feature includes forwarding calls between said mobile station and said wireline phone.

18. The telecommunications system of claim 17, wherein said wireline phone comprises a facsimile machine.

19. The telecommunications system of claim 16, wherein said memory is located within said mobile station.

20. The telecommunications system of claim 16, wherein said memory is located within a home location register within said system and associated within said mobile station.

21. The telecommunications system of claim 16, wherein said positioning means comprises a global positioning system.

22. The telecommunications system of claim 16, wherein said positioning means comprises a triangulation mechanism.

23. The telecommunications system of claim 16, wherein said positioning means determines the location of said mobile station within said system on a predetermined periodic basis.

24. The telecommunications system of claim 16, wherein said at least one selected activation location each comprise a set of coordinates.

25. The telecommunications system of claim 24, wherein said set of coordinates is Cartesian.

26. The telecommunications system of claim 24, wherein said set of coordinates is three-dimensional.

27. A mobile station in a telecommunications network for activating at least one selected feature depending upon a location of the mobile station, comprising:

a programmable subscriber identity module (SIM) card for use with said mobile station, said SIM card storing at least one activation location and at least one selected call forwarding feature associated with said at least one activation location; and a comparator for comparing a specific location of the mobile station within the telecommunications network with said at least one stored activation location to determine whether to activate said at least one selected call forwarding feature based upon whether the specific location is within a preselected distance from the at least one stored activation location.

28. The mobile station of claim 27, wherein said at least one activation location and respective at least one selected call forwarding feature associated therewith are stored within a database within said SIM card.

29. The mobile station of claim 27, wherein said specific location and said at least one activation location each comprise a set of coordinates.

30. The mobile station of claim 29, wherein said set of coordinates is Cartesian.

31. The mobile station of claim 29, wherein said set of coordinates is three-dimensional.

* * * * *